United States Patent
Surles et al.

(10) Patent No.: US 6,196,315 B1
(45) Date of Patent: Mar. 6, 2001

(54) METHODS FOR TREATING UNDERGROUND FORMATIONS

(75) Inventors: Billy Wayne Surles, Houston; Howard Lee McKinzie, Sugar Land, both of TX (US)

(73) Assignee: Texaco Inc., White Plains, NY (US)

( * ) Notice: Subject to any disclaimer, the term of this patent is extended or adjusted under 35 U.S.C. 154(b) by 0 days.

(21) Appl. No.: 08/812,302

(22) Filed: Mar. 5, 1997

(51) Int. Cl.⁷ .................................................. E21B 33/13
(52) U.S. Cl. ............................................ 166/293; 166/295
(58) Field of Search .................................. 166/277, 292, 166/293, 294, 295

(56) References Cited

U.S. PATENT DOCUMENTS

| | | | |
|---|---|---|---|
| 3,727,691 | * 4/1973 | Muecke et al. | 166/295 |
| 3,844,351 | * 10/1974 | Sutton et al. | 166/293 |
| 4,015,995 | * 4/1977 | Hess | 166/295 |
| 4,662,448 | * 5/1987 | Ashford et al. | 166/292 |
| 5,005,648 | * 4/1991 | Friedman et al. | 166/300 |
| 5,503,671 | * 4/1996 | Casabonne et al. | 166/293 |
| 5,692,566 | * 12/1997 | Surles | 166/295 |

* cited by examiner

*Primary Examiner*—William Neuder
(74) *Attorney, Agent, or Firm*—Harold J. Delhommer; William J. Beard

(57) ABSTRACT

This invention relates to methods of treating subterranean formations. An impermeable plug is formed in a section of a cased and perforated borehole by transmitting from the surface a fluid resin comprising a polymerizable polymer and subsequently transmitting from the surface an acid catalyst which causes flash setting of the polymerizable polymer.

24 Claims, No Drawings

METHODS FOR TREATING UNDERGROUND FORMATIONS

FIELD OF THE INVENTION

This invention relates to methods for treating subterranean earth formations. More particularly, the invention relates to improved methods for treating wells to form an impermeable plug where needed. Such impermeable plugs can be used to reduce the permeability of a water producing interval, to reduce the flow of water into a well producing oil from other intervals, or for closing holes or leaks in well casing, or for closing flow chambers in cement, or voids behind the casing.

BACKGROUND OF THE INVENTION

U.S. Pat. Nos. 5,005,647 and 5,005,648 assigned to the present assignee teach the treatment of subterranean earth formations in cased well boreholes by injecting under hydraulic or gravity pressure a treating fluid comprising a polymerizable material which can be acid catalyzed to cure or set in a period of from 1 to 16 hours at formation conditions. The single step injection is performed with the treating fluid which (for high temperature use) contains an oligomer or monomer of furfuryl alcohol, an ester such as ethyl or butyl acetate and a catalyst such as orthonitrobenzoic acid or toluene sulfonic acid in a concentration of from 1% to 4% by weight which is selected to produce a set time at formation temperature in the range of 1 to 16 hours. These are taught in detail in the above referenced two U.S. patents which are incorporated herein by reference for all purposes.

A great number of successful well treatments have been made according to the teachings of the referenced patents. However, a persistent problem which has arisen in some wellbore environments in the placement of such liquid resins for treating formations for water, gas or sand shutoff, has been the excessive leakoff of treating fluid encountered within an interval that has a high permeability zone or a large void space such as exists in a "washed out" region near the borehole. In this environment a large volume of relatively expensive resin can leak off into the unexpected high permeability zone or void prior to the resin setting. This can require repeat treatments to completely cure the problem of water, gas or sand shutoff.

Accordingly, in spite of the successes of the referenced prior patented methods, there is still a substantial unfulfilled need for an inexpensive, simple and reliable procedure which can be applied to wellbore formations in which a high permeability zone or washed out or void region exists near the borehole for shutting off water from a water producing interval, gas from gas producing intervals, for plugging leaks in well casing or flow channels in cement around the casing using a polymerizable composition, and for reducing the cost of such treatment.

BRIEF SUMMARY OF THE INVENTION

In the methods of the present invention a two step technique is disclosed for placing a polymerizable resin treating fluid in a desired borehole interval. In the techniques of the present invention the treating fluid resin, comprising (for use to above 200° F.) a monomer or oligomer of furfuryl alcohol, an ester such as ethyl acetate or butyl acetate, and possibly a water swelling polymer such as copolymer of starch and synthetic polymer such as acrylates or acrylamides, is hydraulically or gravity injected into the desired interval. In a second step, either prior to the injection of the treating fluid resin, or subsequent to the injection of the treating fluid resin, as desired, a sufficient quantity of acid catalyst, such as orthonitrobenzoic acid, toluene sulfonic acid or any other acid is injected to "flash set" the treatment fluid resin. The "flash setting" process raises the internal heat of the setting reaction and causes the solvents used in the resin formulation to boil. This creates gas bubbles throughout the consolidated resin. This, in turn, causes the consolidated resin to become a foam and to occupy a volume of from two to three times its normal space. Because of the random distribution of the bubbles and their lack of connectivity the consolidated resin material remains impermeable, forming a good permeability barrier. This occurs to some extent even with the resin under borehole encountered pressures. Thus, washouts or unexpected voids are filled without the undue use of excess resin. This significantly reduces costs and the necessity for repeat treatments to obtain shutoff.

DETAILED DESCRIPTION OF THE PREFERRED EMBODIMENTS

The methods for treating earth formations according to concepts of the present invention can comprise several embodiments. One application may be to prevent fluid communication from one water producing earth layer to another which produces oil. In this case the water bearing layer is treated to reduce its permeability by the placement of an impermeable barrier between it and the well casing and its perforations. Similarly cement flow channels or voids in cement could be treated with these methods. The treatment produces a solid matrix of polymerized resin which is durable and long lasting and which is resistant to the high temperatures encountered in some wells. The solid matrix is also resistant to the acid and/or alkaline fluids sometimes employed in well stimulation processes.

In a different application, the processes may be applied to a cased well to plug or close a hole which has developed in the casing due to corrosion or mechanical stress such as earth movement. Such undesired casing holes can cause produced hydrocarbons to leak back into the formations in the vicinity of the well borehole. In this application as well as in the water shutoff condition previously discussed, high permeability zones or large "washed out" volumes of earth formations can exist exterior to the casing which are caused by rapid fluid movement. The techniques of treatment according to the present invention significantly decrease the amount of polymerizable resin injected into the earth formations outside the casing to close off such undesired leaks or prevent such water migration.

In yet another application, the techniques of the present invention could be used to plug gravel packs, sometimes errantly placed in long horizontal well bores. In horizontal completions it is desired to drill a horizontal borehole within the upper and lower boundaries of horizontal producing interval which could be only a few feet thick and then complete the well with a gravel pack over the entire horizontal portion of the borehole. If the producing interval is not perfectly coplanar with the borehole, the borehole drilled through it can wander into water bearing formations along its horizontal extent, leading to undesired water production. In such cases the flash setting techniques of the present invention can be used to form impermeable barriers in the portion of the gravel pack completion which is causing the undesired water production.

In the process of the present invention the "flash setting" of a polymerizable resin is used to advantage. In flash setting, a polymerizable resin is contacted with a catalytic acid setting agent which is supplied in a quantity sufficient to cause very rapid setting of the resin. The very rapid setting of flash setting causes the internal heat of the reaction to rise enough to cause the solvents used in the resin to boil. This creates gas bubbles throughout the resin, formed during the setting or consolidation process. In other words a resin "foam" having unconnected voids filled with solvent gasses is created. This causes the consolidated resin to occupy a volume of from two to three times the volume which it would have occupied had flash setting not occurred. Since the produced voids in the consolidated resin are not connected and are randomly distributed throughout its volume the consolidated resin material remains impermeable, heat resistant, and retains its otherwise desirable properties for the earth formation treatment as previously described. Moreover, if desired, a special water swellable polymer can be incorporated into the treating fluid as described in U.S. Pat. No. 5,005,647 where the use of the polymer sold under the registered trademark SGP 5025® and manufactured by the Henkel Corp. of Minneapolis, Minn. is taught. The additive of the water swellable polymer also increases the volume of fill of a given volume of treatment fluid resin.

If the treatment fluid were prepared for a single step injection as taught in the previously referenced U.S. Patents, and enough internal catalyst is added to the resin to obtain flash setting, the resin would solidify in place in the tubing or pump equipment used to deliver it to the treatment zone. This, of course, would be highly undesirable. Accordingly, the formation treatment processes of the present invention comprise two step injection processes. In the processes of the present invention the treatment fluid is delivered into the zone to be treated under hydraulic or gravity injection. However, this treatment fluid is prepared using the resin and special water swellable polymer (if desired) and without the acid catalyst. Enough acid catalyst to cause flash setting is injected in a second separate step, either prior to, or subsequent, to the resin treating fluid delivery to the zone to be treated. If desired, in a preferred embodiment, the catalyst acid is injected by using pressurized acidified nitrogen (acidified with the acid catalyst). The use of the acidified nitrogen offers the additional advantage of providing additional gas which also increases the volume of the consolidated resin when it is set.

In a preferred embodiment the treatment fluid resin is prepared from a mixture of from 40 to 60 percent of a furfuryl alcohol monomer or oligomer. One such compound which has been successfully used is sold under the registered trademark QUACOR 1300® by Q.O. Chemicals. The treating fluid resin also contains from 40 to 60 percent of an ester such as ethyl acetate or butyl acetate. If desired, the treatment fluid resin may also contain from 0.5 to 1.5 percent by weight, and preferably from 0.9 to 1.1 percent by weight, of the water swelling polymer as previously discussed. The prepared treatment fluid resin is then introduced into the earth formation zone to be treated by hydraulic or gravity injection from the tubing string into the isolated zone. The treating fluid resin may be allowed to percolate into the zone to be treated from 1 hour to 24 hours before the introduction of the catalyst acid in the second step, depending on previous experience in the geographical area. However, if desired, the catalyst acid may first be conducted to the zone to be treated and allowed to percolate into the zone. The preferred catalyst acid used in the methods of the present invention is orthonitrobenzioc acid. An appropriate volume of this acid approximately one percent by weight, to cause flash setting is delivered by acidifying nitrogen by delivering flowing pressurized nitrogen through a bath of the acid to create a foam of the acidified nitrogen which is then conducted to the earth formation to be treated by the tubing string. Numerous other methods of delivery of the acid are equally feasible.

When the volume of the treatment fluid resin is contacted by the acidized nitrogen the flash setting process occurs and a set consolidated foam is produced rapidly. As the volume of the treatment fluid resin is greatly increased by the flash setting process and by the inert nitrogen bubbles used in the catalyst acid delivery step being entrained in the consolidated resin, the greatly enhanced volume of the treatment resin more readily expands to fill washouts or voids near the well bore as well as to extend from one to fifteen inches into the unconsolidated formation being treated.

The volume of the treating fluid must be adequate to allow penetration of highly permeable formations plus filling any void spaces. It may leave enough consolidated treatment fluid in the inside of the casing to require it that be drilled out after completion of the treatment.

Many variations of the herein described embodiments of the invention may become apparent to persons skilled in the art without departing from the spirit and scope of the invention. The appended claims are intended to cover all such changes and modifications that come within the true spirit and scope of the invention.

What is claimed is:

1. A method for treating a cased and perforated borehole to form a solid impermeable barrier outside the casing in the cased and perforated borehole to shut off water or gas transmission along the casing or to repair casing leaks comprising the steps of:

transmitting from the surface via well tubing to the cased and perforated borehole section to be treated, a well treatment fluid resin comprising a polymerizable polymer being polymerized upon contacting it with an acid catalyst, and an ester; and subsequently transmitting from the surface via well tubing to the cased and perforated section to be treated, a quantity of an acid catalyst sufficient to cause flash setting of said polymerizable polymer.

2. The method of claim 1 wherein said treatment fluid resin is allowed to percolate through the borehole in a said perforated casing into the zone to be treated under gravity influence for a predetermined period of time.

3. The method of claim 1 wherein said polymerizable polymer comprises a monomer or oligomer of furfuryl alcohol.

4. The method of claim 3 wherein said ester comprises ethyl acetate.

5. The method of claim 3 wherein said ester comprises butyl acetate.

6. The method of claim 1 wherein said acid catalyst comprises an acidized nitrogen mixture under pressure.

7. The method of claim 6 wherein said acid catalyst comprises an orthonitrobenzoic acid as an acidized nitrogen mixture.

8. The method of claim 6 wherein said acid catalyst comprises a toluene sulfonic acid as an acidized nitrogen mixture.

9. The method of claim 1 wherein the method steps are performed in a horizontal completion borehole to shut off undesired water or gas intrusion in a gravel pack completion.

10. The method of claim 1 wherein the method steps are performed in a well completed with an open hole completion below said casing.

11. The method of claim 1 wherein the method steps are performed in a well completed with a screen or liner completion below said casing.

12. The method of claim 1 wherein the transmitting fluid steps are performed by hydraulic pressure pumping.

13. A method for treating a perforated cased well to form a solid impermeable barrier outside the casing to shut off water or gas transmission along the casing or to repair casing leaks comprising the steps of:

initially transmitting from the surface via well tubing to the perforated casing section to be treated a quantity an acid catalyst sufficient to cause flash setting of a polymerizable polymer upon contacting it; and subsequently transmitting from the surface via well tubing to the section of perforated casing to be treated, a well treatment fluid resin, comprising a polymerizable polymer, said polymerizable polymer be polymerized upon contacting it with an acid catalyst, and an ester.

14. The method of claim 13 wherein said treatment fluid resin is allowed to percolate through the perforated casing into the zone to be treated under gravity influence for a predetermined period of time.

15. The method of claim 13 wherein said polymerizble polymer comprises a monomer or oligomer of furfuryl alcohol.

16. The method of claim 15 wherein said ester comprises ethyl acetate.

17. The method of claim 15 wherein said ester comprises butyl acetate.

18. The method of claim 13 wherein said acid catalyst comprises an acidized nitrogen mixture.

19. The method of claim 18 wherein said acid catalyst comprises a orthonitrobenzoic acid as an acidized nitrogen mixture.

20. The method of claim 18 wherein said acid catalyst comprises a toluene sulfonic acid as an acidized nitrogen mixture.

21. The method of claim 13 wherein the method steps are performed in a horizontal completion borehole to shut off undesired water or gas intrusion in a gravel pack completion below said casing.

22. The method of claim 13 wherein the method steps are performed in a well completion below said casing with an open hole completion.

23. The method of claim 13 wherein the method steps are performed in a well completed with a screen or liner completion below said casing.

24. The method of claim 13 wherein the transmitting fluid steps are performed by hydraulic pressure pumping.

* * * * *